Jan. 17, 1967 H. W. ALYEA 3,298,658
LENGTH-CHANGING MECHANISM FOR LINKAGE OF AN ACTUATED DEVICE
Filed June 19, 1964
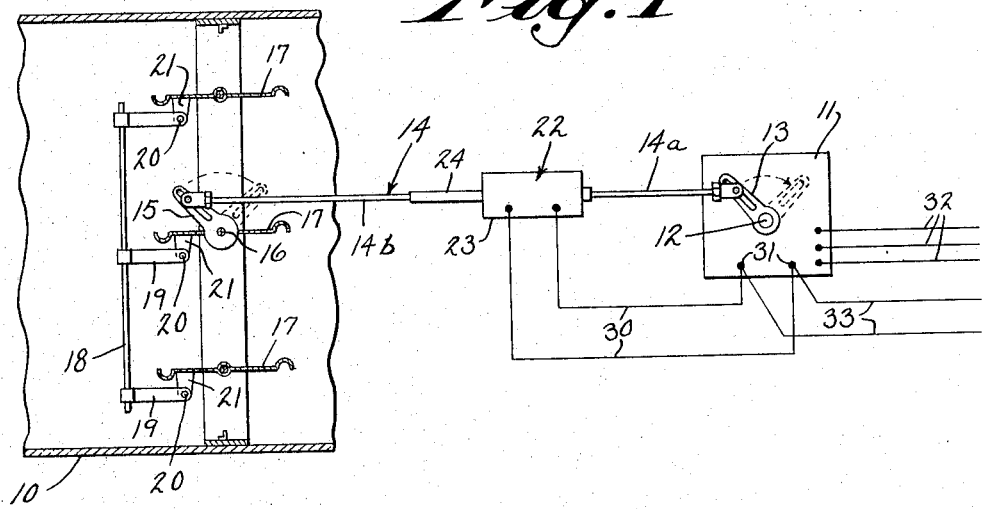
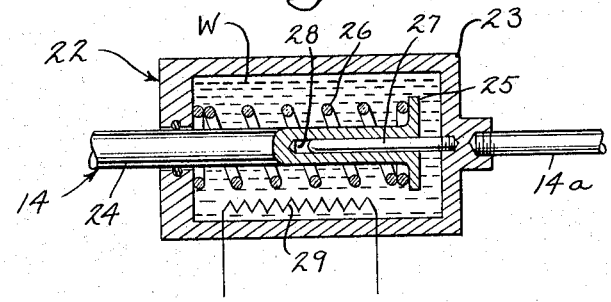
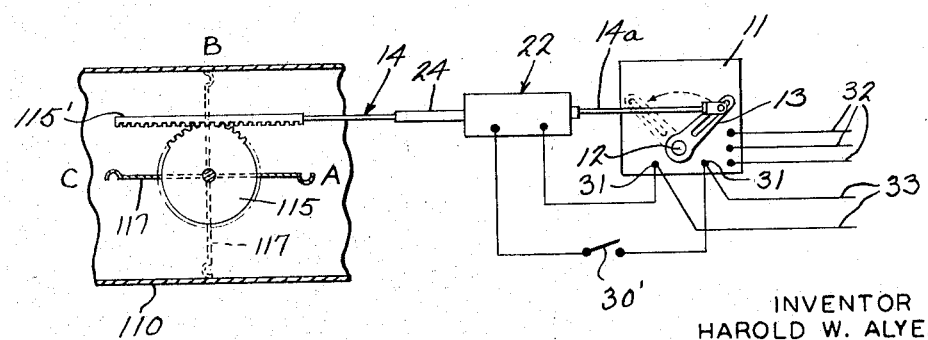
INVENTOR
HAROLD W. ALYEA
BY
ATTORNEYS United States Patent Office 3,298,658
Patented Jan. 17, 1967

3,298,658
LENGTH-CHANGING MECHANISM FOR LINKAGE
OF AN ACTUATED DEVICE
Harold W. Alyea, Waukesha, Wis., assignor to Johnson Service Company, Milwaukee, Wis., a corporation of Wisconsin
Filed June 19, 1964, Ser. No. 376,386
4 Claims. (Cl. 251—11)

This invention relates to improvements in length-changing mechanism for linkage of an actuated device, and more particularly to mechanism for readily changing the effective length of the connecting link between an actuating motor and an actuated member, either for purposes of safety in an emergency, or for effecting a change of phase.

Electric motor-driven actuators are commonly employed to convert an electrical input signal into mechanical motion. This motion is in turn used to move various devices, such as a louvered damper in a duct system. Depending upon the requirements of the particular system, such an actuator may regulate the damper from open to closed position, and vice versa, without any intermediate stops, or it may be arranged to permit the damper to stop in any position.

Where such dampers or other actuated devices have an electric motor as a prime mover it is frequently desirable that the damper or other device return to a definite position in the event of failure of the electric power to the actuator. For example, where a damper controls the admission of outdoor air into a building, it is important that the damper atuomatically move to a closed position when there is power failure. Otherwise, in winter, there may be danger of freezing equipment by admitting too much cold air.

Heretofore it has been attempted to utilize a torsion spring, usually as an integral part of the actuator, to provide the energy to return the damper or other actuated device to its normal or safe position in the event of power failure, the spring being automatically rewound when the actuator travels in the opposite direction. This system has the obvious disadvantage of reducing the useful torque of the actuator to about one-third of the value which it would have without the return spring. In addition, inasmuch as the spring is an integral part of the actuator, certain standardization is lost.

It has also been attempted to employ stored electrical energy which is brought into play on power failure to drive the actuator to its normal or safe position. This type of system has high material and installation costs and requires extra space.

It is a general object of the present invention to provide improved length-changing mechanism for linkage which eliminates the disadvantages of prior arrangements as above outlined, and which is applicable to any and all types of electric actuators to cause automatic change in the effective length of the linkage and return of the actuated device to a safe position in case of power failure.

A more specific object of the invention is to provide a new combination wherein a heat motor is employed in the linkage between the electric actuator and the actuated device to change the effective linkage length, said heat motor being arranged to cause automatic closing of the actuated device in case of power failure to the electric actuator.

A further object of the invention is to provide length-changing mechanism which may also be effectively employed to change the phase relationship between a motor actuator and an actuated element whereby movement of a motor actuator will operate in one situation to move a damper from open to closed position, and whereby with simple energization of the length-changing mechanism, the same actuator movement can be made to cause the damper to move from closed to open position. Such mechanism is useful, for example, in combination heating and cooling systems where the damper must operate in reverse during one season, such as the cooling season, from its operation in the other, or heating season.

With the above and other objects in view, the invention consists of the improved length-changing mechanism, and all of its parts and combinations, as set forth in the claims, and all equivalents thereof.

In the accompanying drawing, illustrating one complete embodiment of a preferred form of the invention, in which the same reference numerals designate the same parts in all of the views:

FIG. 1 is a partially diagrammatic view showing a longitudinal vertical section through a fragment of an air duct with a louvered damper therein, and showing the electric motor-driven actuator for the damper with the improved length-changing mechanism incorporated in the connecting linkage;

FIG. 2 is a longitudinal sectional view through the heat motor showing a fragment of the piston projecting from one end and a fragment of a connecting link from the opposite end; and FIG. 3 is a partially diagrammatic view showing how the device may be used to change the phase relationship between a motor actuator and damper.

Referring more particularly to FIGS. 1 and 2 of the drawings, the numeral 11 designates an electric motor having an oscillatory shaft 12 carrying a crank arm 13. A connecting link, designated generally by the numeral 14, connects the crank arm 13 with a similar arm 15 on a damper shaft 16 for rotating a damper blade 17 to and from closed position in a duct 10. In the installation illustrated there are two other blades 17 connected to the central blade for simultaneous operation therewith, through any suitable means such as is provided by the rod 18 having arms 19 pivoted as at 20 to ears 21 projecting from the damper blades.

Interposed between two sections 14a and 14b of the connecting link is a heat motor designated generally by the numeral 22. It includes a cylinder 23 which is closed at its ends. One end of the cylinder is rigidly connected to the connecting link section 14a. A piston rod 24 is slidable through a suitably sealed opening at the other end of the heat motor, and has its outer end rigidly connected with the left section 14b of the connecting link. Within the cylinder 23 the piston rod carries a piston 25 and there is a return spring 26 between the piston and the end of the cylinder which faces the actuated device. A guide rod 27 projecting into the cylinder from its right hand end is slidably received in a bore 28 of the piston rod.

The cylinder 23 is filled with a heat-expansive fluid such as wax W. Preferably this is a special wax having a melting point of 170°–180° F. When the wax is heated it expands and displaces the piston to the left to compress the spring 26. Thus, as long as the wax is kept in heated condition, there is energy stored in the spring.

Within the fluid chamber is an electric heater 29. It is connected by wires 30 with the line terminals 31 of the electric motor, there being other electric wires 32 leading from the motor to a control circuit. Operation of the heater is dependent upon the flow of current in the line 33.

Referring now to FIG. 3 of the drawing, this illustrates an adaptation showing how the invention may be utilized to change the phase relationship between a motor actuator and a device to be actuated, such as a damper. In this form of the invention, common parts are indicated by the same reference numerals as in FIG. 1. The damper blade 117, however, is mounted for 180° rotation in a duct 110, and has a shaft with a pinion 115 thereon which is operated by a rack 115' on the link 14. The arrangement is such that if the crank arm 13 of the electric motor-driven actuator 11 moves 90° in a counter-clockwise direction from the full line position of FIG. 3 to the dot and dash line position it will, when there is no energy on the heater 29 of the heat motor 22, cause 90° movement of an end of the damper blade 117 in a counter-clockwise direction from the full line position A of FIG. 3 to the dot and dash line position B, thus moving the damper from open to closed position. The wires 30 of the heating element of the heat motor 22 are connected to a source of current and there is a switch 30'. If the switch 30' is closed, the heat motor 22 will cause 90° movement of the blade 117 from position A to the broken line closed position B. Then when the actuating motor 11 is operated 90° in a counter-clockwise direction as before to move the crank arm 13 from full line to broken line position, instead of moving the damper from open to closed position, it will be effective to move the damper from closed position B of FIG. 3 to open position C. Thus, with the heat motor 14 energized, the phase of the actuated device is in effect changed 90°.

*Operation*

In the combination of FIG. 1, when there is no failure in the line 33 the heater 29 is kept energized. This keeps the wax W melted, in which condition it undergoes a large increase in volume. Such increase in volume maintains the piston 25 displaced to the left to keep the spring in a compressed, energy-storing condition.

In the illustrated adaptation of the invention of FIG. 1, the stroke of the heat motor is worked out to be the same as that of the crank arm 15 of the damper. Thus, when electric energy is supplied to both the electric motor 11 and the heat motor 22 the motor-driven actuator can function as dictated by its control circuit 32, and the heat motor is in operative condition to maintain the connecting link 14 at its correct length for normal operation of the damper 17.

Should there be a failure of electric energy in the line 33 the motor-driven actuator 11 remains stationary. However, upon such failure, there is also a failure of current to the heater 29, the wax W cools, taking up less volume in the cylinder 23, and allowing the energy stored in the spring 26 to move the piston 25 to the right to effect a shortening of the effective length of the connecting link 14 by way of a pull on the portion 14b, and thus rotate the damper blades 17 clockwise from the full line position of FIG. 1 to a closed position. This operation will take place whether the damper was wide open or only partially open at the time of power failure.

In operation of the arrangement of FIG. 3, assuming that the duct 110 controls the flow of air in a combination heating and cooling system, it is apparent that the same movement of the actuating motor 11 (from full line position of FIG. 3 to the broken line position) may be made to bring about reverse damper actuation depending upon whether or not the switch 30' to the heat motor is opened or closed. Thus, during the heating season, the switch 30' may be left open so that when the thermostat calls for less heat, upon a rise in temperature, the damper 117 will be moved from the open position A to closed position B. When the equipment is being used for cooling, on the other hand, the switch 30' may be left closed so that the damper is normally held by the heat motor in the closed position B shown in FIG. 3. Then if the temperature rises in a room, the thermostat will act through the control circuit 32 to call for cooling and the motor 11 will be actuated from full line position to the broken line position as before, but it will serve to move the damper blade from the closed position B to the open position C to allow flow of cooling air.

Various other changes and adaptations may be made without departing from the spirit of the invention, and all of such changes are contemplated as may come within the scope of the claims.

What I claim is:

1. In combination, an electric motor-driven actuator, an electric circuit for said actuator, a movably-supported device to be actuated, means including connecting linkage between said actuator and device to be actuated for transmitting motion to the latter, and an electrically-operated length-varying member included in said linkage and wired in the electric circuit for said actuator, said length-varying member including means responsive to failure in the electric circuit to said actuator for effecting a variance in the effective length of said linkage when said failure occurs.

2. In combination, an electric motor-driven actuator, an electric circuit for said actuator, a movably-supported device to be actuated, means including connecting linkage between said actuator and device to be actuated for transmitting motion to the latter, and an electric heat motor included in said linkage and wired in the circuit to said actuator, said heat motor including means responsive to failure in the electric circuit to said actuator for effecting a variance in the effective length of said linkage when such failure occurs.

3. In combination, an electric motor-driven actuator, an electric circuit for said actuator, a fluid duct, a movably-supported damper in said duct, means including connecting linkage between said actuator and damper for operating the damper, and an electrically-operated length-varying member included in said linkage and wired in the electric circuit for said actuator, said length-varying member including means responsive to failure in the electric circuit to said actuator for effecting a variance in the effective length of said linkage to cause movement of the damper to a safe position when there is failure in the circuit of said electric actuator.

4. In combination, an electric motor-driven actuator, an electric circuit for said actuator, a movably-supported device to be actuated, a cylinder having closed ends, a link between said actuator and one of said cylinder ends, a piston in said cylinder having a rod slidable through the other end of said cylinder to provide an externally-projecting end for the piston rod, a spring surrounding said piston rod between the piston and last-mentioned cylinder end normally maintaining said piston rod in retracted position in said cylinder, a link between the externally-projecting end of said piston rod and the device to be actuated, a heat-expansible medium in said cylinder, and an electric heater in said cylinder wired in the circuit to said actuator for causing the heat-expansible medium to maintain the piston rod in extended position when the heater is energized whereby, upon failure in the electric circuit to the actuator, the heater will be de-energized to permit said spring to cause movement of the actuated device to a predetermined safe position.

References Cited by the Examiner

UNITED STATES PATENTS

| | | | |
|---|---|---|---|
| 558,256 | 4/1896 | Bush | 251—138 X |
| 2,265,524 | 12/1941 | Fruth | 137—49 |
| 2,391,342 | 12/1945 | Peterson et al. | 251—11 |

M. CARY NELSON, *Primary Examiner.*

ARNOLD ROSENTHAL, *Examiner.*